US008717983B2

(12) United States Patent
Wei et al.

(10) Patent No.: US 8,717,983 B2
(45) Date of Patent: May 6, 2014

(54) MECHANISM OF DYNAMIC RESOURCE TRANSACTION FOR WIRELESS OFDMA SYSTEMS

(75) Inventors: Hong-Yu Wei, Taipei (TW); Yih-Shen Chen, Hsinchu (TW); I-Kang Fu, Taipei (TW); Shih-Lung Chao, Taipei (TW); Guan-Yu Lin, Caotun Township, Nantou County (TW)

(73) Assignee: National Taiwan University MediaTek Inc. (TW)

( * ) Notice: Subject to any disclaimer, the term of this patent is extended or adjusted under 35 U.S.C. 154(b) by 362 days.

(21) Appl. No.: 12/798,592

(22) Filed: Apr. 6, 2010

(65) Prior Publication Data
US 2010/0254344 A1 Oct. 7, 2010

Related U.S. Application Data

(60) Provisional application No. 61/167,222, filed on Apr. 7, 2009.

(51) Int. Cl.
*H04W 28/04* (2009.01)

(52) U.S. Cl.
USPC .......................... 370/329; 370/342; 455/453

(58) Field of Classification Search
USPC .......... 370/329–338, 342, 237–238; 455/453, 455/447, 63.1
See application file for complete search history.

(56) References Cited

U.S. PATENT DOCUMENTS

| 6,455,958 | B1 | 9/2002 | Asao et al. ........................ 310/51 |
| 7,664,467 | B2 * | 2/2010 | Cheng et al. .................... 455/70 |
| 8,265,029 | B2 * | 9/2012 | McBeath et al. ............... 370/330 |
| 2005/0249322 | A1 | 11/2005 | Gerlach ........................ 375/355 |
| 2007/0004423 | A1 | 1/2007 | Geriach et al. ............. 455/452.2 |
| 2009/0201867 | A1 * | 8/2009 | Teo et al. ....................... 370/329 |
| 2009/0264077 | A1 * | 10/2009 | Damnjanovic ............... 455/63.1 |
| 2010/0015987 | A1 | 1/2010 | Katori et al. .................. 455/450 |
| 2010/0040019 | A1 * | 2/2010 | Tinnakornsrisuphap et al. ........................... 370/331 |
| 2011/0136496 | A1 | 6/2011 | Klang et al. ............... 455/452.1 |

FOREIGN PATENT DOCUMENTS

| CN | 1694558 A | 11/2005 |
| JP | 11-508417 | 3/2002 |
| JP | 2006352860 | 12/2006 |

(Continued)

OTHER PUBLICATIONS

SIPO, the First Examination Opinion of Chinese patent application 201080001017.9, dated Mar. 26, 2012. (3 pages).

(Continued)

*Primary Examiner* — Ricky Ngo
*Assistant Examiner* — Iqbal Zaidi
(74) *Attorney, Agent, or Firm* — Zheng Jin; Imperium Patent Works

(57) ABSTRACT

A method of dynamic resource transaction in wireless OFDMA systems is proposed. In macro-femto overlay network architecture, network and traffic condition varies dynamically. Dynamic resource transaction is a powerful mechanism to achieve effective interference mitigation and flexible radio resource management to enhance resource utilization as well as to improve link performance. Dynamic resource transaction can be performed by signaling or message exchange through backhaul network or air-interface connections. The signal or message through backhaul network can be directly exchanged among multiple base stations or be routed through a centralized self-organizing network (SON) server. In one embodiment, dynamic resource transaction is used to achieve adaptive reservation region configuration, a solution to avoid interference and frequent handover for high-speed mobile stations.

16 Claims, 9 Drawing Sheets

(56) References Cited

FOREIGN PATENT DOCUMENTS

| | | |
|---|---|---|
| JP | 2007129405 | 5/2007 |
| JP | 2007533224 | 11/2007 |
| JP | 2007074718 | 10/2008 |
| WO | WO2007108769 A1 | 9/2007 |
| WO | WO2008126302 | 10/2008 |

OTHER PUBLICATIONS

Taiwan IPO, the Examination Opinion of TW patent application 099110698 dated Apr. 17, 2013 (6 pages).
JPOA of Japanese patent application JP2012-503852 dated Jan. 22, 2013 (10 pages).

* cited by examiner

RESOURCE REQUEST THROUGH SON
SERVER

RESOURCE REQUEST THROUGH
MULTICAST POLLING

RESOURCE RELEASE THROUGH SON SERVER

RESOURCE RENT THROUGH MULTICAST POLLING

METHOD OF ADAPTIVE RESERVATION
REGION CONFIGURATION

MECHANISM OF DYNAMIC RESOURCE TRANSACTION FOR WIRELESS OFDMA SYSTEMS

CROSS REFERENCE TO RELATED APPLICATION

This application claims priority under 35 U.S.C. §119 from U.S. Provisional Application No. 61/167,222, entitled "A Mechanism of Dynamic Resource Transaction for Wireless OFDMA Systems," filed on Apr. 7, 2009, the subject matter of which is incorporated herein by reference.

TECHNICAL FIELD

The disclosed embodiments relate to wireless OFDMA systems, and more particularly to dynamic resource transaction for wireless OFDMA systems.

BACKGROUND

As bandwidth demand for indoor wireless users continues to grow, cellular operators are trying to explore bandwidth provisioned from indoor, in addition to providing bandwidth from outdoor. Because of the physical nature of radio signals, however, cellular operators have faced difficulties to provide full coverage for indoor users. Femtocell is developed to enhance indoor coverage by reusing the licensed spectrum as part of the cellular network infrastructure. Femtocell is anticipated to be an important feature to support extreme high-speed transmission for 4G systems. Both IEEE 802.16m and 3GPP are currently developing femtocell technology as part of the standards for WiMAX 2.0 and LTE-Advanced systems. As more small-coverage femto base stations are deployed into existing wireless networks, it becomes more popular for wireless networks to have overlay macro-femto network architecture.

FIG. 1 (Prior Art) illustrates an overlay macro-femto network architecture and radio resource allocation in wireless OFDMA network 10. Wireless OFDMA network 10 comprises a macro base station MBS11 serving cell 17, two femto base stations FBS12 and FBS13 serving cells 18 and 19, and a mobile station MS14. The cell coverage of FBS12 and FBS13 is much smaller than the cell coverage of MBS11. In addition, the cell coverage of FBS12 and FBS13 overlaps with the cell coverage of MBS11. As illustrated in FIG. 1, mobile station MS14 is located in the service coverage of cell 17 and receives desired radio signals 15 from its serving base station MBS11. Because of the overlay macro-femto network architecture, however, MS14 is also located close to cells 18 and 19, and receives interfering radio signals 16 from FBS12 and FBS13.

There are different alternatives in allocating radio resource in wireless OFDMA networks. Two different resource allocation schemes are illustrated in FIG. 1. In the first example, frequency reuse three (i.e., FR=3) is used so that each base station uses a different frequency spectrum for data transmission. In the second example, frequency reuse one (i.e., FR=1) is used so that each base station uses the entire frequency spectrum for data transmission. While frequency reuse three provides high SINR to meet the minimum quality of service (QoS) requirement, it suffers from low cell throughput and resource utilization. On the other hand, while frequency reuse one achieves higher cell throughput and resource utilization, it suffers from low SINR and poor QoS. Therefore, in macro-femto overlay wireless networks, it is desirable to have flexible radio resource management schemes to improve the spectral utilization efficiency as well as to meet minimum QoS requirement.

SUMMARY

A method of dynamic resource transaction in wireless OFDMA systems is proposed. In one novel aspect, dynamic resource transaction (DRT) among multiple base stations can be performed to mitigate inter-cell interference in a macro-femto overlay wireless OFDMA network. The overlay base stations first obtain interference measurement result over a specified radio resource region, then make DRT decision based on the interference measurement result, and finally perform DRT between macro-to-femto or femto-to-femto base stations. DRT can be performed by signaling or message exchange through backhaul network or air-interface connections. The signal or message through backhaul network can be directly exchanged among multiple base stations or be routed through a centralized self-organizing network (SON) server.

Dynamic resource transaction is also a powerful tool to achieve flexible and adaptive self-organizing radio resource management (RRM). Under self-organizing RRM, base stations may estimate network condition, exchange network resource and traffic information, and dynamically negotiate and transact resource with each other to enhance resource utilization and efficiency. Based on the negotiation result, each base station may further optimize its intra-cell RRM by adjusting its resource schedule and sending out corresponding resource allocation commands to its subordinate mobile stations. In one novel aspect, DRT can be used as a mechanism for adaptive reservation region configuration. Reservation region configuration is a special kind of radio resource management. Under the concept of reservation region, base stations negotiate a predefined resource region that is reserved for high-priority mobile stations. Upon changed network condition, base stations may also apply DRT to adjust the reservation region configuration.

In one embodiment, adaptive reservation region configuration provides a solution to avoid interference and frequent handover for high-speed mobile stations. In a macro-femto overlay network, a macro base station and a femto base station first negotiate a predefined resource region that is reserved for high-speed mobile stations. Once a high-speed mobile station served by the macro base station is approaching the femto base station, interference avoidance mechanism is then triggered to mitigate interference caused by the femto base station as well as to avoid frequent handovers for the high-speed mobile station. For example, while the macro base station serves the high-speed mobile station over the negotiated resource region, the femto base station reschedules its subordinate mobile stations not to be served by the negotiated resource region. In addition, the macro base station does not grant any handover request made by the high-speed mobile station if the handover target is a femto base station.

Other embodiments and advantages are described in the detailed description below. This summary does not purport to define the invention. The invention is defined by the claims.

BRIEF DESCRIPTION OF THE DRAWINGS

The accompanying drawings, where like numerals indicate like components, illustrate embodiments of the invention.

DETAILED DESCRIPTION

Reference will now be made in detail to some embodiments of the invention, examples of which are illustrated in the accompanying drawings.

In wireless OFDMA networks, radio resource is initially statically allocated among different base stations based on network architecture and condition to meet minimum quality of service (QoS) requirement while maximize system capacity. Frequency reuse is an important technique to improve the overall system capacity by reusing the scarce radio spectrum resource. Reusing the radio spectrum, however, will result in inter-cell interference because the same frequency band is reused by different base stations serving neighboring cells or overlapping cells. In wireless networks with overlapping macrocell-femtocell architecture, it is especially desirable to have robust interference mitigation mechanism to avoid or reduce inter-cell interference caused by frequency reuse in macro-femto overlay environment.

Figure 1:
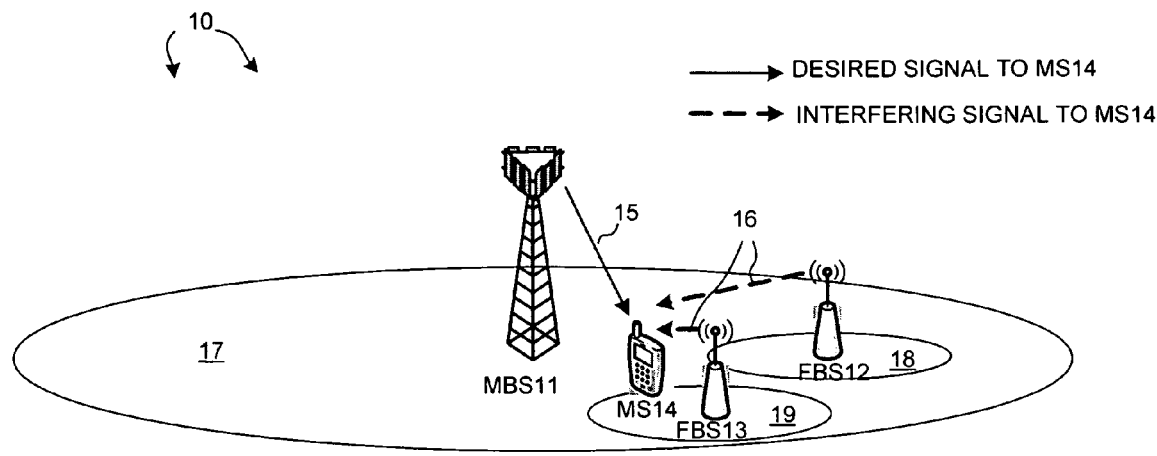
FIG. 1 (Prior Art) illustrates an overlay macro-femto network architecture and radio resource allocation in a wireless OFDMA network.
Figure 1:
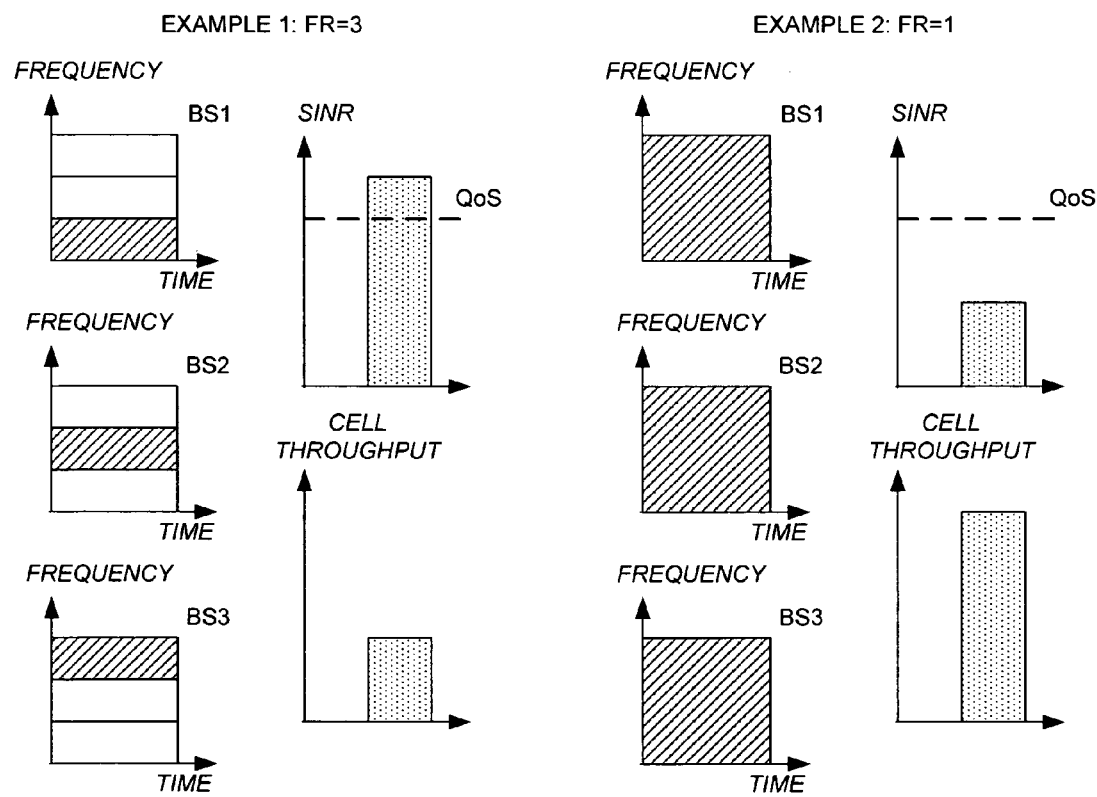
Figure 2:
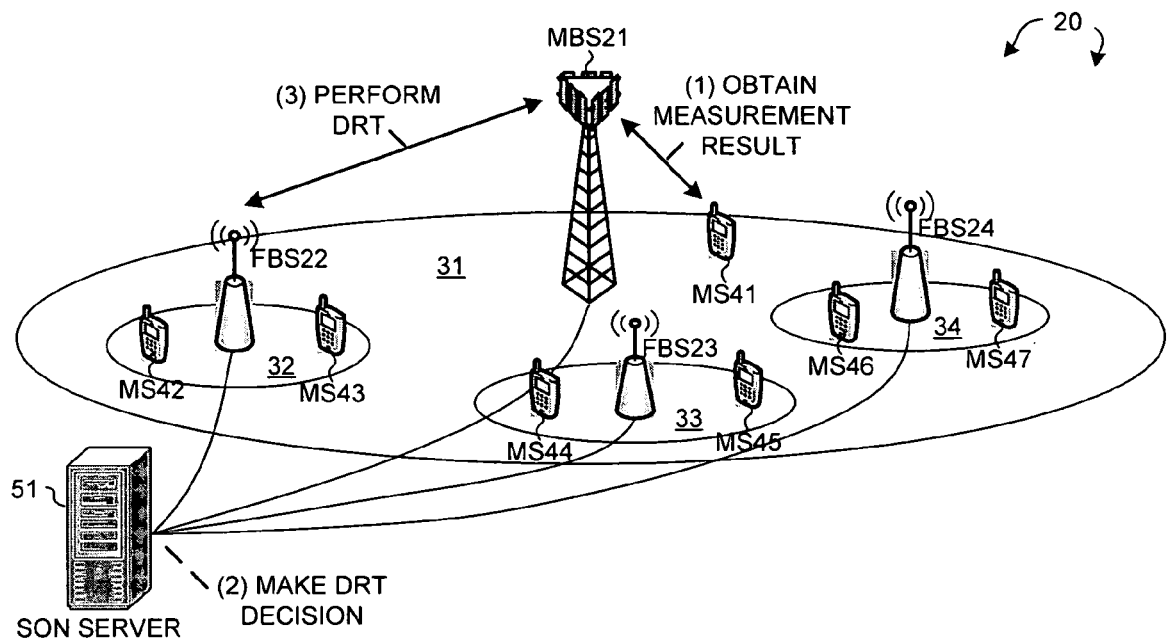
FIG. 2 illustrates a wireless OFDMA network with overlay macro-femto architecture and interference mitigation in accordance with one novel aspect.

FIG. 2 illustrates a wireless OFDMA network 20 with macro-femto overlay architecture in accordance with one novel aspect. OFDMA network 20 comprises a macro base station MBS21 providing coverage for cell 31, three femto base stations FBS22, FBS23, and FBS24 providing coverage for cells 32, 33, and 34 respectively, a plurality of mobile stations MS41-MS47, and a self-organizing network (SON) server 51. As illustrated in FIG. 2, the cell coverage provided by femto base stations FBS22-24 are much smaller as compared to the cell coverage provided by macro base station MBS21. In addition, femto base stations FBS22-24 are deployed within cell 31, forming a macro-femto overlay network.

In wireless OFDMA networks having macro-femto overlay network architecture, interference sources may appear or disappear dynamically due to the mobility nature of mobile stations. For example, interference from CGS femtocells may decrease dramatically when users leave home for work, and may increase dramatically when users go home from work. In addition, channel selection and scheduling in femtocells may affect the interference condition in certain time-frequency radio resource blocks in macrocells. In general, inter-cell interference from macrocells and femtocells depends on the number of users as well as their locations and traffic loads. For a specific radio resource region (i.e., time-frequency radio resource blocks), its corresponding interference condition thus varies dynamically.

In one novel aspect, dynamic resource transaction (DRT) among base stations can be performed to mitigate inter-cell interference in macro-femto overlay wireless OFDMA network 20. As illustrated in FIG. 2, the overlay base stations first obtain interference measurement result over a specified radio resource region, then make DRT decision based on the interference measurement result, and finally perform DRT between macro-to-femto or femto-to-femto base stations. The interference measurement result may include an interference power, a signal to interference ratio (SIR), a signal to interference-plus-noise ratio (SINR), or other SIR/SINR derived form. In one embodiment, SON server 51 is used to facilitate the DRT process. For example, the base stations may forward the interference measurement result to SON server 51, which makes the DRT decision based on the interference measurement result and forward the DRT decision back to the base stations. SON server 51 can be implemented either as a standalone device, or as a functional module embedded within one of the base stations in OFDMA network 20. In some embodiments, a macro and femto networks are only partially overlapped and the interference avoidance mechanism is applied onto the macro-femto overlay region.

Figure 3:
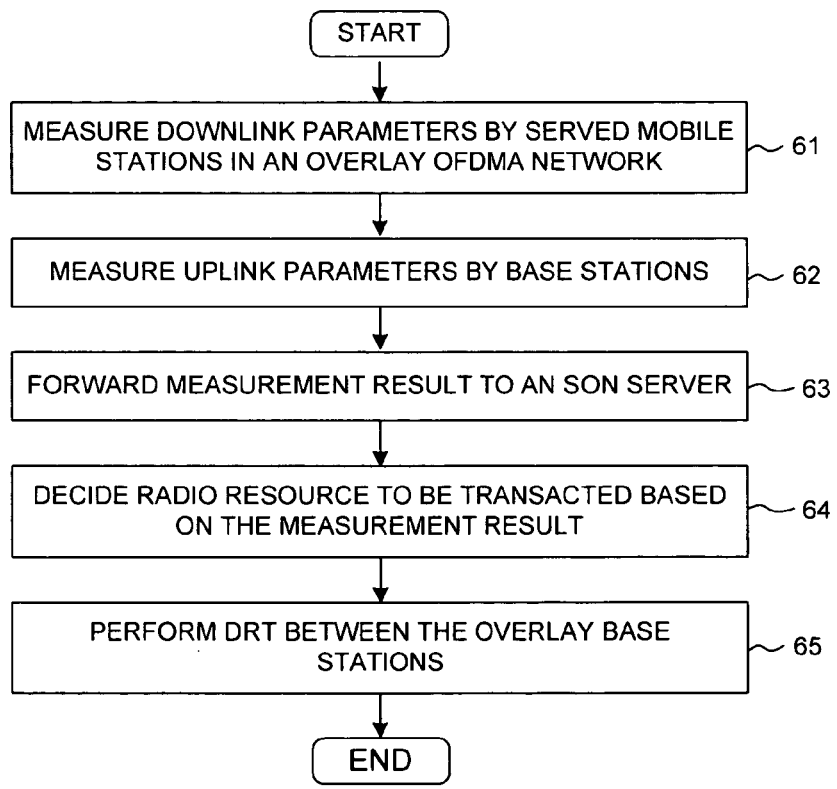
FIG. 3 is a flow chart of a method of performing dynamic resource transaction in an overlay macro-femto wireless network in accordance with one novel aspect.

FIG. 3 is a flow chart of a method of performing dynamic resource transaction (DRT) in a macro-femto overlay wireless network in accordance with one novel aspect. For a specific downlink resource region, one or more served mobile stations measure the quality of the downlink resource region and send the measurement report to its serving base station (step 61). For a specific uplink resource region, one or more base stations measure the quality of the uplink resource region (step 62). The measurement report is then forwarded to an SON server by the base stations (step 63). Based on the measurement report, the SON server makes DRT decision and forward the DRT decision back to the base stations (step 64). Finally, the base stations perform DRT between macro-femto and femto-femto base stations (step 65) to mitigate inter-cell interference. For example, a base station may request radio resource blocks with low interference, or request radio resource blocks that will cause low interference to other cells; it may release radio resource blocks with severe interference, or release radio resource blocks that will cause severe interference to other cells; and it may exchange radio resource blocks with other base stations to mitigate inter-cell'interference.

DRT can be performed by signaling or message exchange between different base stations and the SON server through backhaul network connections or air-interface connections. Several basic types of resource transactions can be performed between different base stations and the SON server. First, a base station may use "resource request" message/signaling to ask for more resource from other base stations. Second, a base station may use "resource grant" message/signaling to grant resource to other base stations. Third, a base station may use "resource release" message/signaling to release unused resource permanently, or "resource rent" message/signaling to release unused resource temporarily. In addition, a base station may use "request to release" message/signaling to request other base stations not to use a specific radio resource region temporarily. FIGS. 4-8 illustrate different examples of the DRT process.

Figure 4:
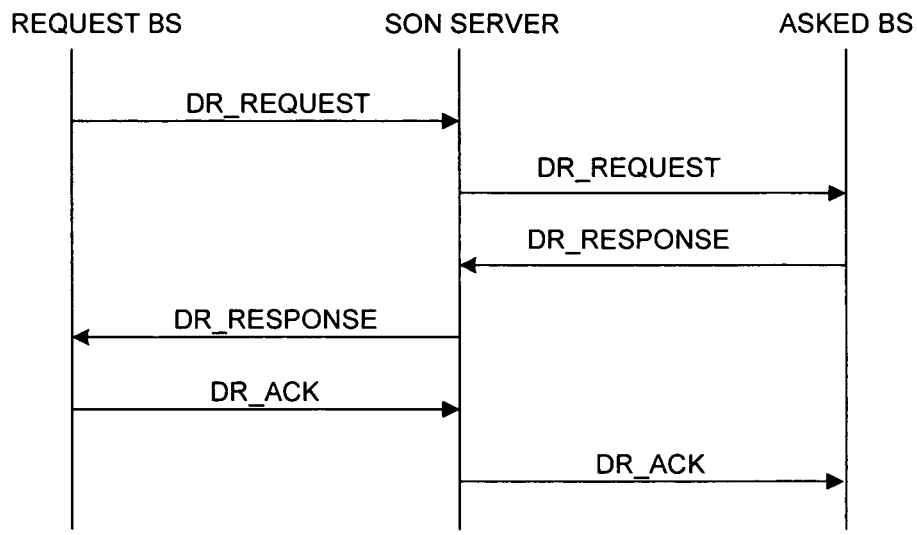
FIG. 4 is a message sequence chart of a first example of dynamic resource transaction.

FIG. 4 is a message sequence chart of a first example of dynamic resource transaction that involves a resource request message. In the example of FIG. 4, a first base station (Request-BS) transmits a dynamic resource request message (DR_REQUEST) to an SON server. The DR_REQUEST specifies the radio resource that the Request-BS wants to borrow. The time of returning the borrowed resource may also be included. The SON server forwards the DR_REQUEST to a second base station (Asked-BS). After receiving the DR_REQUEST, the Asked-BS transmits a dynamic resource response message (DR_RESPONSE) back to the SON server. The DR_RESPONSE indicates whether the resource request is agreed, or indicates information of the resource that is agreed to be borrowed. The SON server forwards the DR_RESPONSE to the Request-BS. After receiving the DR_RESPONSE, the Request-BS transmits a dynamic resource acknowledgment (DR_ACK) to confirm the completion of resource request. If no resource is allowed to be borrowed, then the DR_ACK may be omitted. The SON server again forwards the DR_ACK to the Asked-BS. Finally, the right to use the requested resource is transferred from the Asked-BS to the Request-BS.

Figure 5:
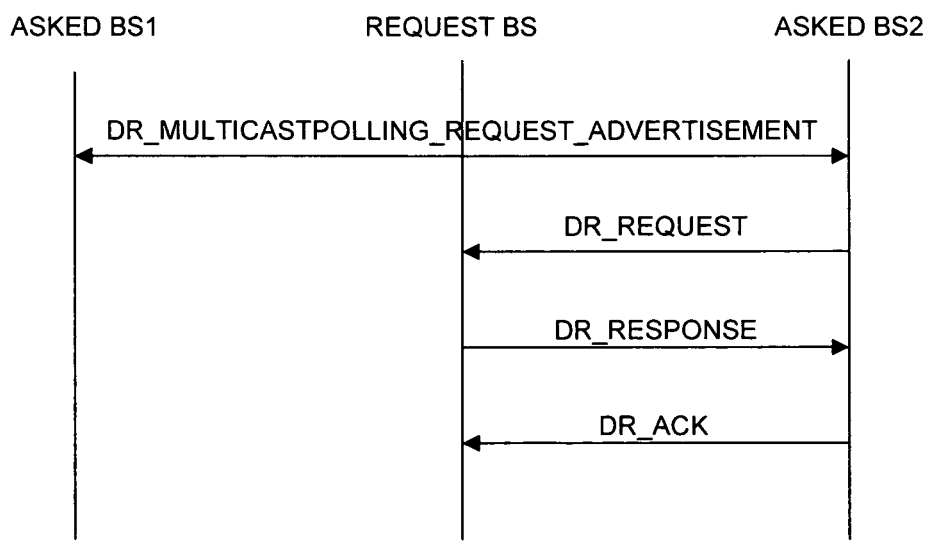
FIG. 5 is a message sequence chart of a second example of dynamic resource transaction.

FIG. 5 is a message sequence chart of a second example of dynamic resource transaction that involves resource request through multicast polling. In the example of FIG. 5, a first base station (Request-BS) transmits a dynamic resource request advertisement message/signaling (DR_MULTICASTPOLLING_REQUEST_ADVERTISEMENT) through multicast polling to multiple base stations including an Asked-BS1 and an Asked-BS2. After receiving the advertisement, the Asked-BS2 transmits a DR_REQUEST to the Request-BS requesting to borrow specified radio resource. The Request-BS then transmits a DR_RESPONSE to the Asked-BS2 indicating the resource it agrees to be borrowed. Finally, the Asked-BS2 transmits an acknowledgement (DR_ACK) back to the Request-BS confirming the completion of the resource request. It is noted that there is no SON server intervening between base stations in the multicast polling scenario.

Figure 6:
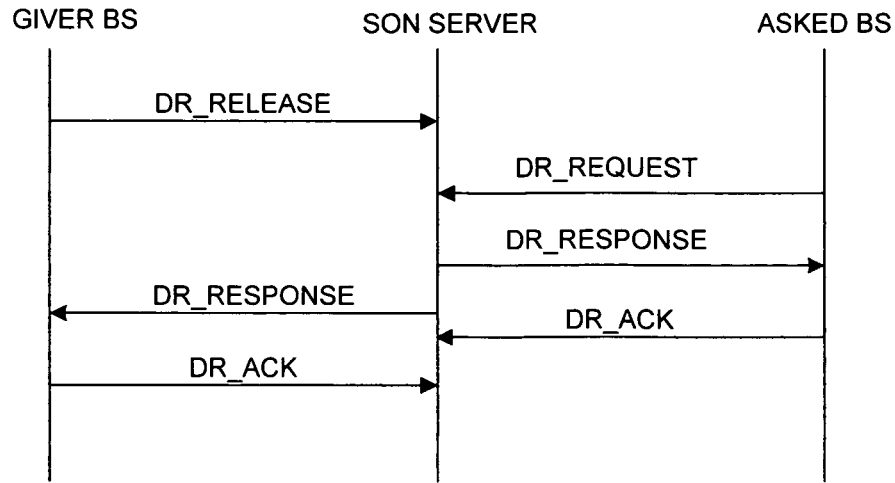
FIG. 6 is a message sequence chart of a third example of dynamic resource transaction.

FIG. 6 is a message sequence chart of a third example of dynamic resource transaction that involves a resource release message. In the example of FIG. 6, a first base station (Giver-BS) transmits a dynamic resource release message (DR_RELEASE) to an SON server. The DR_RELEASE specifies the unused radio resource that the Giver-BS is willing to release permanently. Subsequently, the SON server receives a dynamic resource request message (DR_REQUEST) from a second base station (Asked-BS) requesting for more radio resource. The SON server then makes DRT decision and transmits a first dynamic resource response message (DR_RESPONSE) back to the Asked-BS. The first DR_RESPONSE indicates whether the resource request is agreed, or indicates information of the resource that is agreed to be borrowed. The SON server also transmits a second DR_RESPONSE to the Giver-BS. The second DR_RESPONSE indicates whether the resource released by the Giver-BS is accepted. After receiving the DR_RESPONSEs, both the Asked-BS and the Giver-BS transmit an acknowledgment (DR_ACK) to the SON server to confirm the completion of request and resource release. Finally, the right to use the released resource is transferred from the Giver-BS to the Asked-BS permanently.

Figure 7:
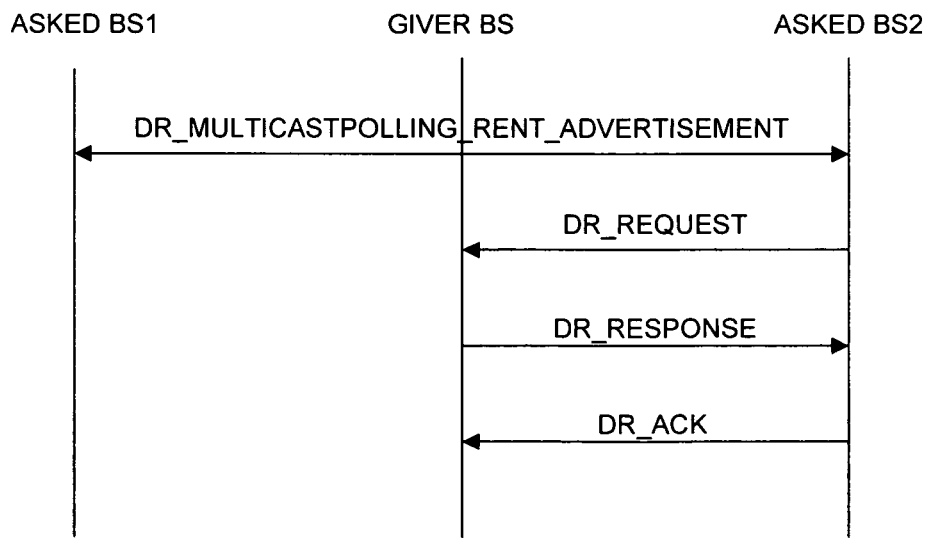
FIG. 7 is a message sequence chart of a fourth example of dynamic resource transaction.

FIG. 7 is a message sequence chart of a fourth example of dynamic resource transaction that involves resource rent through multicast polling. In the example of FIG. 7, a first base station (Giver-BS) transmits a dynamic resource rent advertisement message/signaling (DR_MULTICASTPOLLING_RENT_ADVERTISEMENT) through multicast polling to multiple base stations including an Asked-BS1 and an Asked-BS2. After receiving the advertisement for resource rent, the Asked-BS2 transmits a DR_REQUEST to the Giver-BS requesting to borrow specified radio resource. The Giver-BS then transmits a DR_RESPONSE to the Asked-BS2 indicating the resource it agrees to rent temporarily. Finally, the Asked-BS2 transmits an acknowledgement (DR_ACK) back to the Giver-BS confirming the completion of the resource rent.

Figure 8:
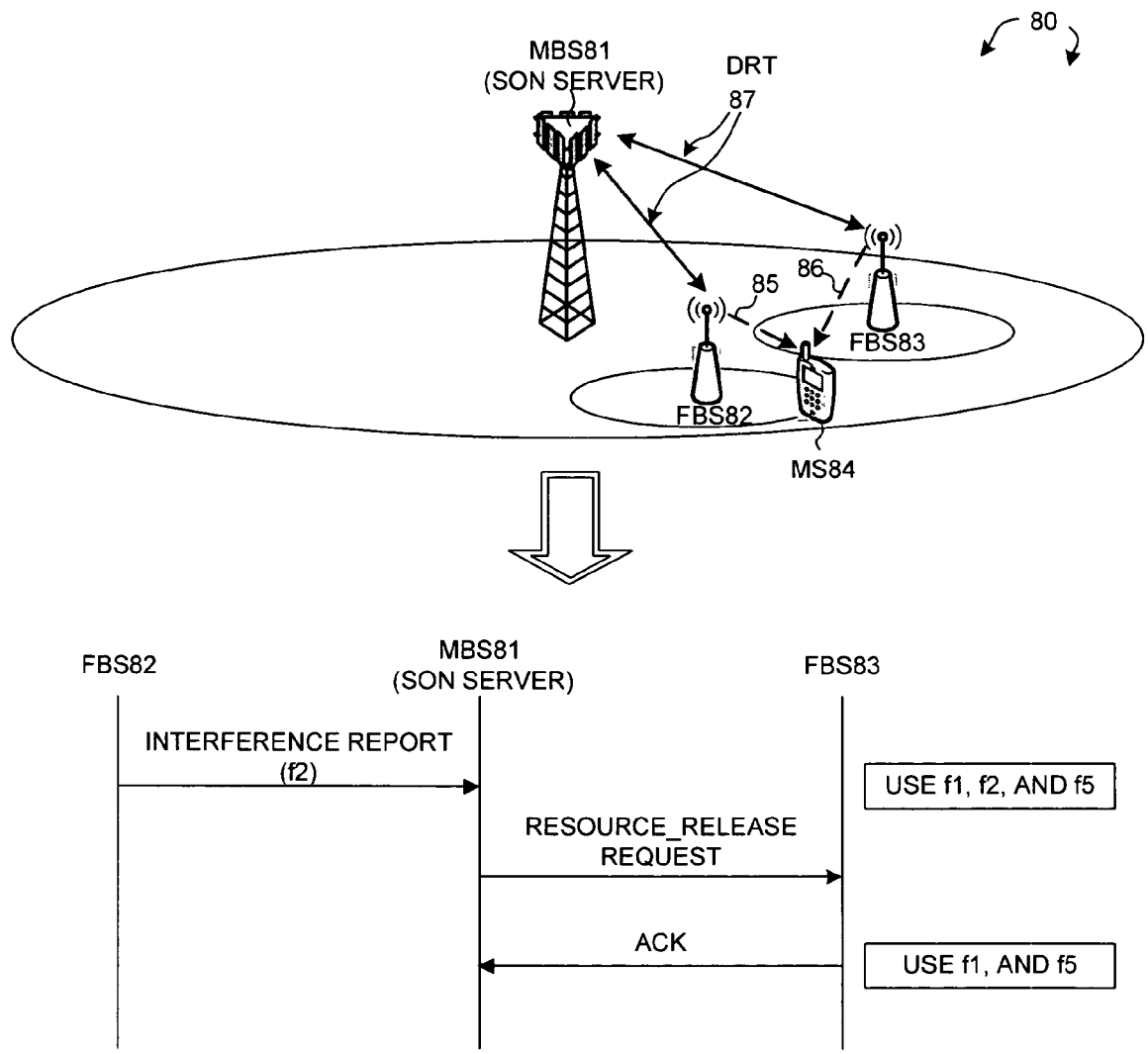
FIG. 8 illustrates one embodiment of using dynamic resource transaction to achieve interference mitigation in a wireless OFDMA network.

FIG. 8 illustrates one embodiment of using dynamic resource transaction to achieve interference mitigation in wireless OFDMA network 80. Wireless OFDMA network 80 comprises a macro base station MBS81, two femto base stations FBS82 and FBS83, and a mobile station MS84. In the example of FIG. 8, FBS82 uses allocated wireless channels (i.e., resource blocks f2, f3, and f4) to serve its subordinate mobile stations, while FBS83 uses allocated wireless channels (i.e., resource blocks f1, f2, and f5) to serve its subordinate mobile stations. Because mobile station MS84 is located near both FBS82 and FBS83, it receives desired signal 85 from its serving FBS82 as well as interfering signal 86 from neighboring FBS83 over the same resource block f2.

As illustrated in FIG. 8, FBS82 first obtains an interference report over a specific time-frequency radio resource region (i.e., resource block f2). The interference report indicates severe interference over f2. FBS82 then forwards the interference report to an SON server. For example, MBS81 is also a SON server for wireless OFDMA network 80. To reduce the severe interference, MBS81 (the SON server) sends a resource release request message (RESOURCE_RELEASE_REQUEST) to FBS83. The message requests FBS83 to stop using some of its own resource. The message includes information of the specific resource to be stopped, and may indicate the expiration time of the forbidden to use. After receiving the RESOURCE_RELEASE_REQUEST, FBS83 stops using resource block f2 and sends an acknowledgment (ACK) back to MBS81 (the SON server). By forbidding FBS83 to use a specific radio resource region over a specific time based on the interference report via DRT, MS84 is relieved from severe interference over that resource region.

Dynamic resource transaction (DRT) can be used not only for interference mitigation, but also as a powerful tool for self-organizing radio resource management (RRM) to enhance resource utilization and efficiency in wireless OFDMA networks. Because of the nature of burst traffic for data application and traffic load variation in femtocells (especially in CGS femto), flexible and adaptive radio resource allocation becomes critical, especially for macro-femto overlay network environment. Under self-organizing RRM, base stations may estimate network condition, exchange network resource and traffic information, and dynamically negotiate and transact resource with each other to enhance resource utilization and efficiency.

Figure 9:
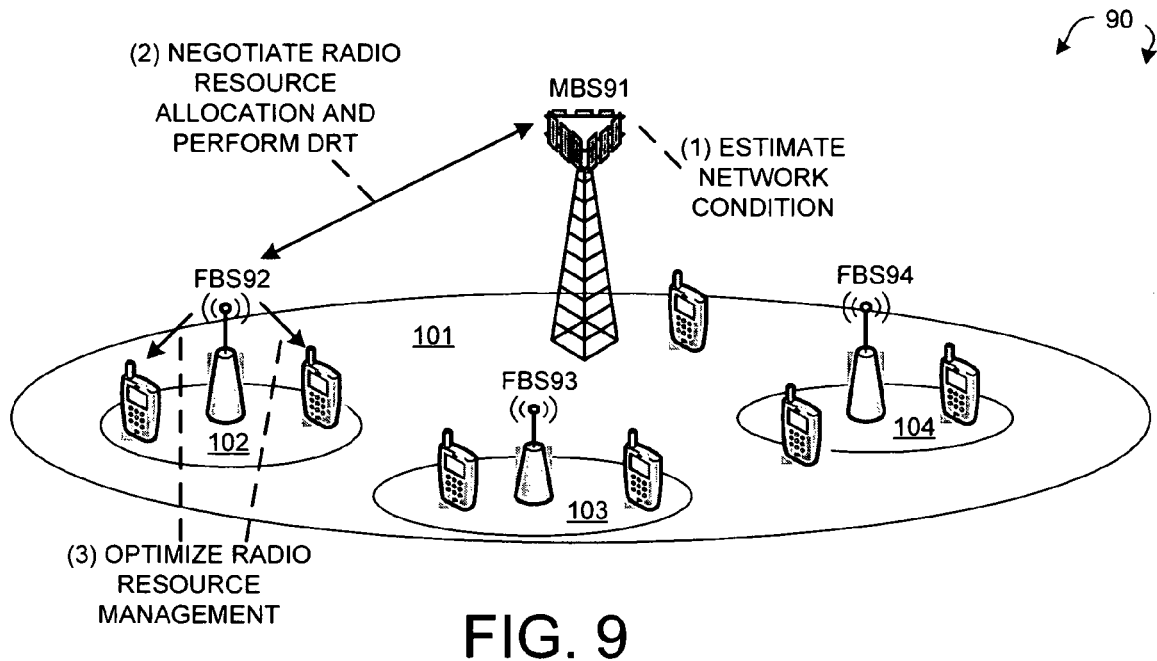
FIG. 9 illustrates a wireless OFDMA network with overlay macro-femto architecture and radio resource management in accordance with one novel aspect.

FIG. 9 illustrates a wireless OFDMA network 90 with overlay macro-femto architecture and radio resource management in accordance with one novel aspect. Wireless OFDMA network 90 is very similar to wireless OFDMA network 20 of FIG. 2. Wireless OFDMA network 90 comprises a macro base station MBS91 providing coverage for cell 101, three femto base stations FBS92, FBS93, and FBS94 providing coverage for cells 102, 103, and 104 respectively, and a plurality of mobile stations. As illustrated in FIG. 9, the cell coverage provided by femto base stations FBS92-94 are much smaller as compared to the cell coverage provided by macro base station MBS91. In addition, femto base stations FBS92-94 are deployed within cell 101, forming a macro-femto overlay network. To perform RRM, the overlay base stations first estimate network condition, then negotiate usage of specific radio resource region by initiating DRT among the base stations, and finally optimize intra-cell RRM based on the negotiation result. In one embodiment, macro base station MBS91 is also an SON server that facilitates the DRT process.

Figure 10:
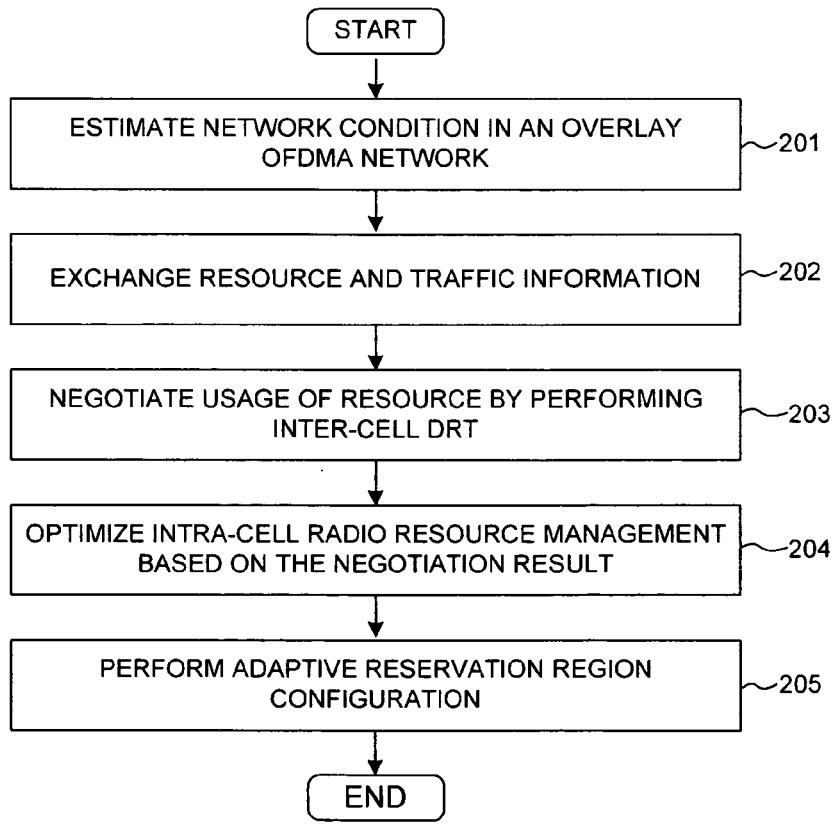
FIG. 10 is a flow chart of a method of performing radio resource management in an overlay macro-femto wireless network in accordance with one novel aspect.

FIG. 10 is a flow chart of a method of performing radio resource management in a macro-femto overlay wireless network in accordance with one novel aspect. Each base station first estimates/obtains its cell operating condition such as cell loading, mobile station resource requirement, and interference condition, etc. (step 201). Optionally, the base stations may exchange any estimated traffic and resource information as well as any obtained interference measurement report (step 202). The base stations then negotiate the usage of specific radio resource region (i.e., composite time-frequency radio resource blocks) and the radio parameters (i.e., transmit power, modulation and coding scheme, and MIMO scheme) for transmission over the specific radio resource region (step 203). The negotiation among multiple cells is performed via inter-cell DRT by signaling or message exchange through backhaul network or air-interface connections. The negotiation signal or message through backhaul network can be directly exchanged among multiple cells or be routed through a centralized SON server.

Based on the negotiation result, each base station may further optimize its intra-cell RRM by adjusting its resource schedule and sending out corresponding resource allocation commands to its subordinate mobile stations (step 204). In one example, a base station may allocate sleep mode enabled mobile stations to certain time slots such that the radio resource usage is concentrated in those few time slots. The remaining empty time slots could then be released or rented out. In another example, a base station may schedule transmission or apply polling mechanism to the borrowed radio resource regions such that those available resource regions can be used efficiently.

In one novel aspect, dynamic resource transaction (DRT) can be used as a mechanism for adaptive reservation region configuration (step 205). Reservation region (RR) configuration is a special kind of radio resource management. Under the concept of reservation region, base stations negotiate a predefined resource region that is reserved for high-priority mobile stations. For example, mobile stations having high mobility (i.e., cells phones in a high-speed car) have high priority. Those high-priority mobile stations can be scheduled for data transmission using the negotiated resource region.

Figure 11:
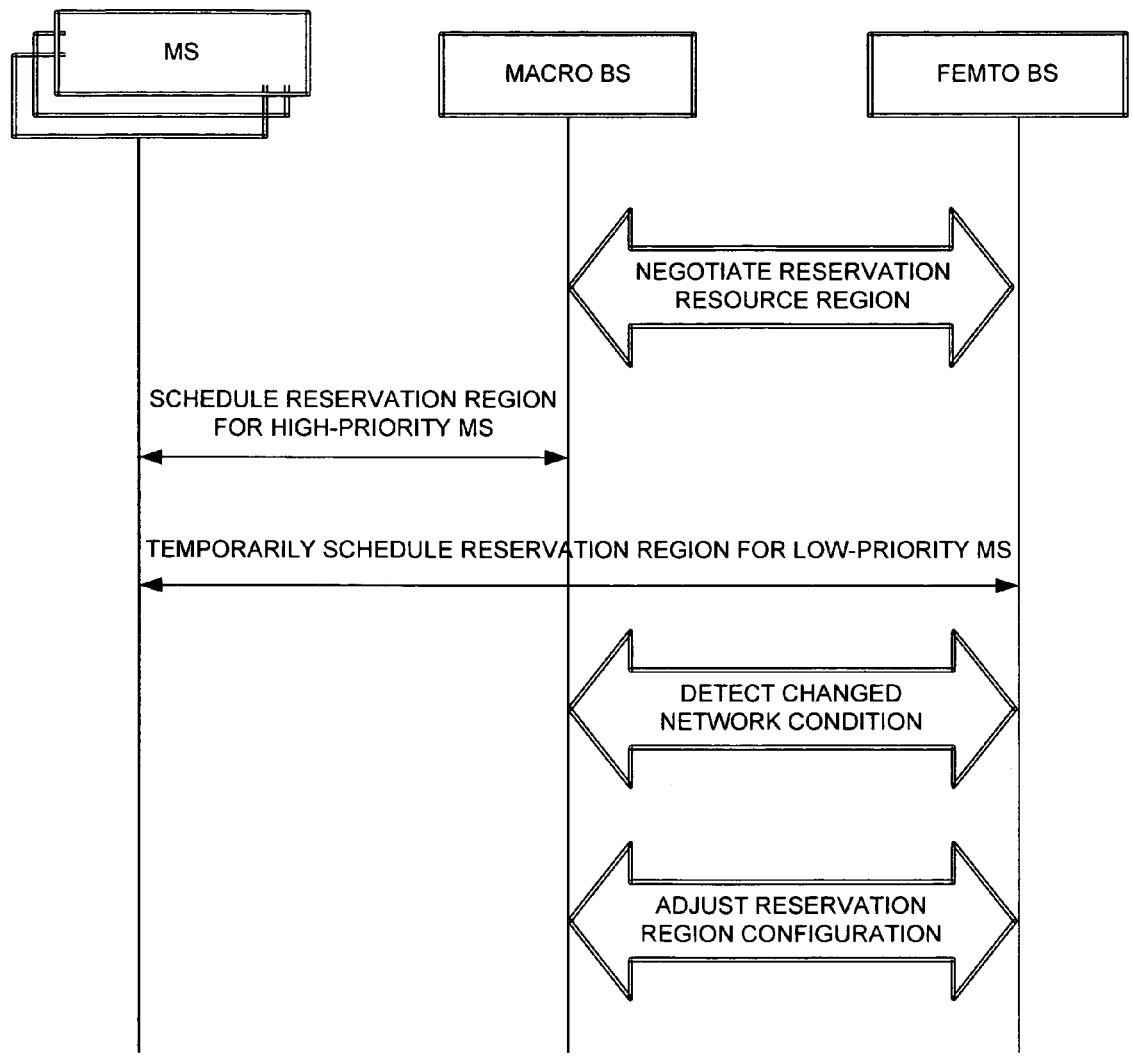
FIG. 11 is an operation chart of adaptive reservation region configuration using dynamic resource transaction.

FIG. 11 is an operation chart of adaptive reservation region configuration using DRT. As illustrated in FIG. 11, a macro base station and a femto base station first negotiate a reservation region (RR) between each other. The macro BS then schedules the RR resource blocks for its high-priority mobile stations. The RR resource blocks, however, may also be temporarily allocated to mobile stations without high priority. DRT may be applied to send signaling messages so that either the macro BS or the femto BS may temporarily use the RR resource blocks for low-priority mobile stations. Furthermore, when network conditions are changed and detected by the base stations, the base stations may apply DRT by sending signaling messages to adjust the RR configuration. For example, the quantity of reservation and the specific resource blocks to be reserved may be adjusted based on the changed network condition such as interference level for the RR resource blocks, network load condition of the overlay macrocell or femtocell, or a specific QoS target.

Figure 12:
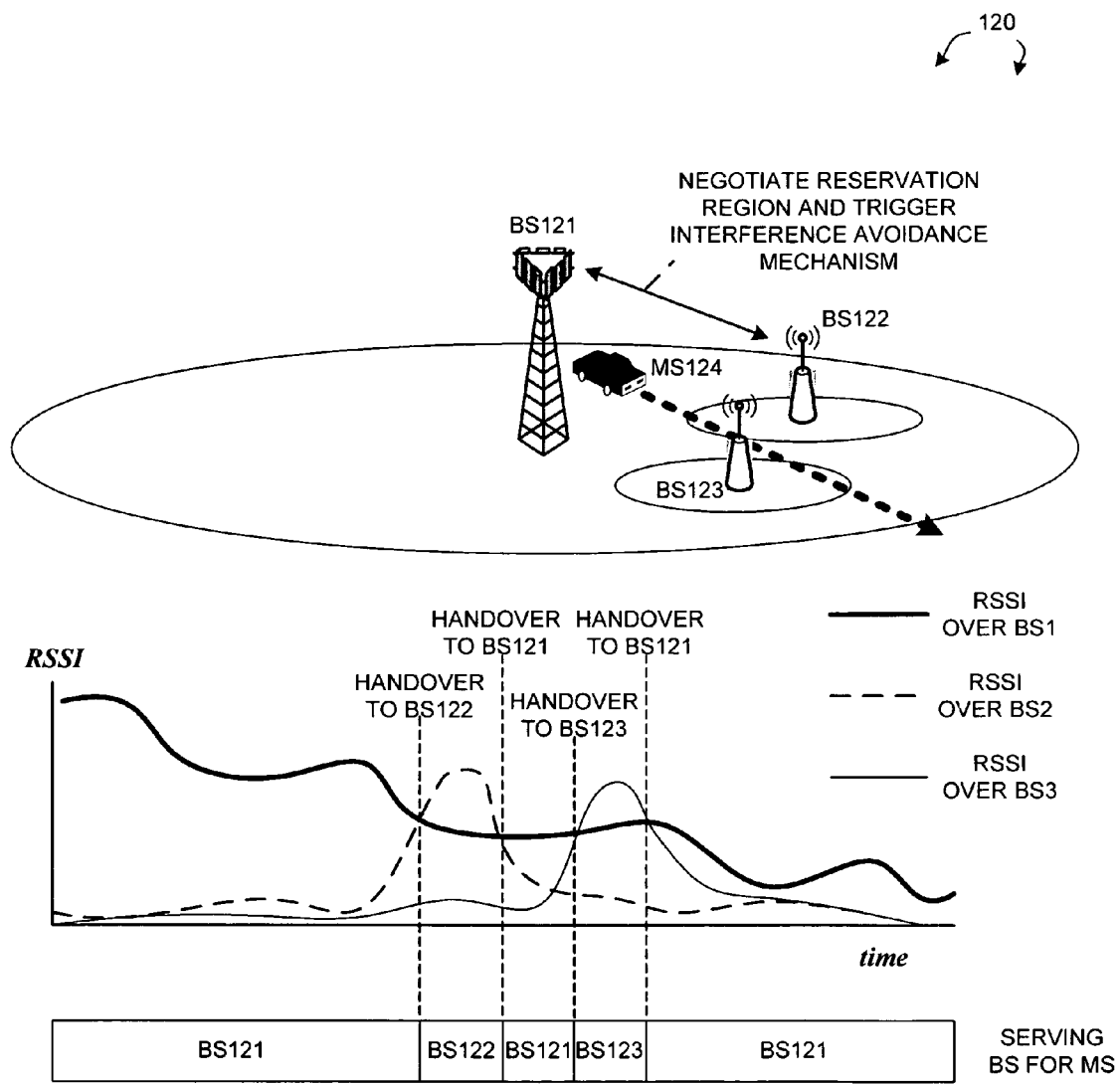
FIG. 12 illustrates a wireless OFDMA network having a high-speed mobile station being served in a negotiated resource region.

In one embodiment, DRT can be used to achieve adaptive reservation region configuration, a solution to avoid frequent handover and interference for high-speed mobile stations. FIG. 12 illustrates a wireless OFDMA network 120 having a high-speed mobile station in accordance with one novel aspect. Wireless OFDMA network 120 comprises a macro base station MBS121, two overlapping femto base stations FBS122 and FBS123, and a mobile station MS124 in a high-speed vehicle. As illustrated in FIG. 12, when high-speed MS124 is leaving its serving MBS121 and driving towards femto base stations FBS122 and FBS123, its received signal strength indication (RSSI) for each base station changes over time. To receive the best signal quality, MS124 typically would try to hand over to the base station that provides the strongest signal strength. Consequently, frequent handovers would happen to MS124 because of the small cell coverage of FBS122 and FBS123. The frequent handovers would result in huge signaling and traffic overhead in backhaul network. In addition, MS124 would still suffer service disruption due to frequent radio link switching.

In one novel aspect, when a high-speed MS is approaching a femtocell in a macro-femto overlay network, instead of triggering handover procedure, interference avoidance mechanism is applied. As illustrated in FIG. 12, macro base station MBS121 and femto base stations FBS122 and FBS123 first negotiate a predefined resource region that is reserved for high-speed mobile stations. High-speed MS124 is then served by MBS121 over the negotiated resource region. Once MBS121 detects that MS124 is approaching another femto base station, interference avoidance mechanism is then triggered to mitigate interference caused by the femto base station as well as to avoid frequent handovers for MS124. In one embodiment, the detection is performed by the measurement report from the femto base stations. In another embodiment, the detection is performed by the location report of the mobile stations.

Figure 13:
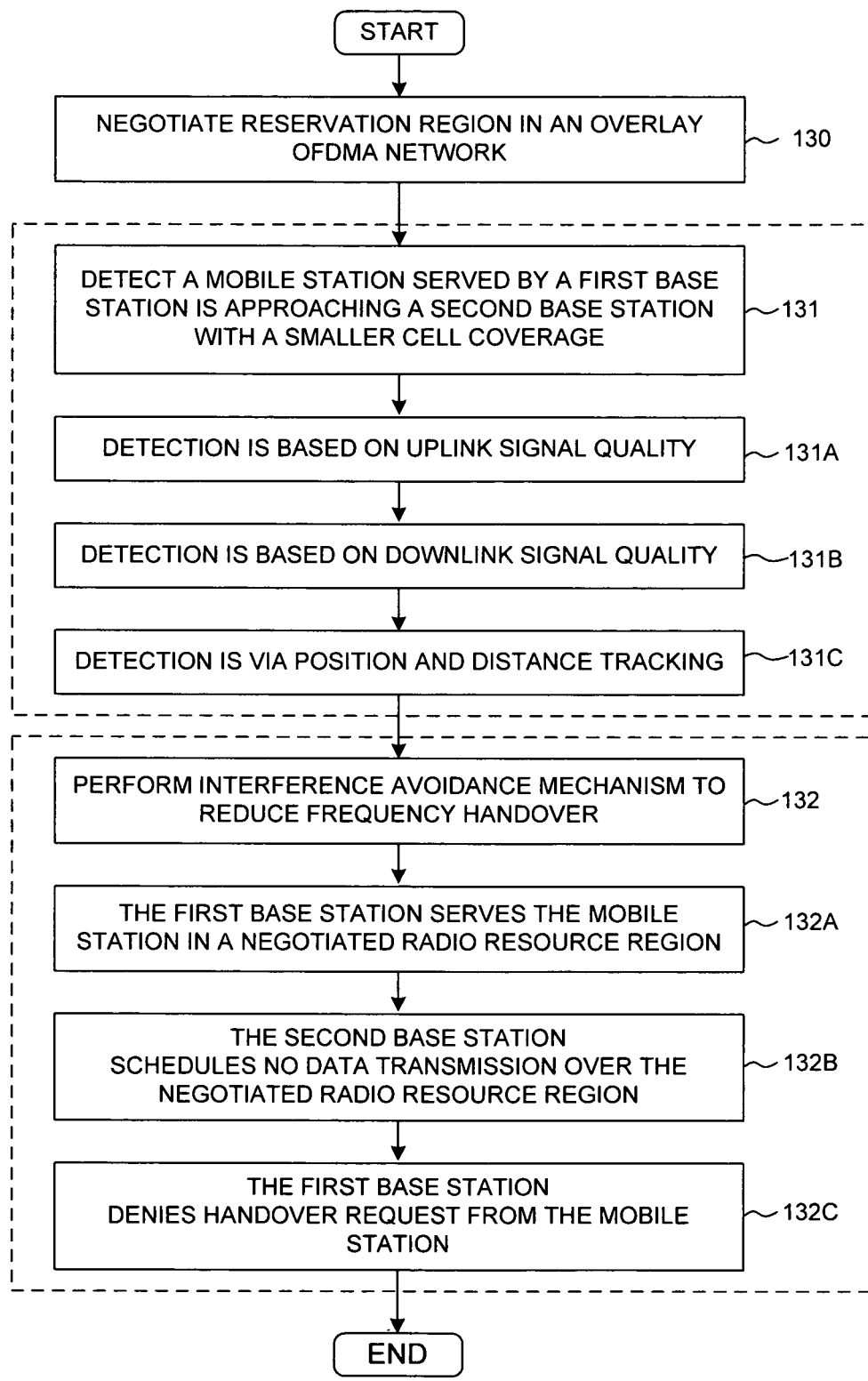
FIG. 13 is a flow chart of a method of interference avoidance in an overlay macro-femto wireless network in accordance with one novel aspect.

FIG. 13 is a flow chart of a method of interference avoidance in an overlay macro-femto wireless network in accordance with one novel aspect. A macro base station and a femto base station in the wireless network first negotiate a predefined resource region that is reserved for high-speed mobile stations (step 130). A high-speed mobile station is served by the macro BS over the negotiated resource region. When the high-speed MS is approaching the femto BS in the network, either the macro BS or the femto BS detects such condition (step 131). In an example for downlink, the macro BS monitors the SINR reported by its subordinate MSs that are scheduled to be served by the negotiated resource region. If the reported SINR is suddenly dropped but there is not much change on radio link parameters, then the macro BS can expect that the MS is approaching femtocell coverage (step 131A). Similarly, in another example for uplink, the femto BS monitors the SINR of its subordinate MSs that are scheduled to be served by the negotiated resource region. If the measured SINR is suddenly dropped, then the femto BS can expect that another MS served by the macro BS is approaching (step 131B). Alternatively, the serving BS (i.e., the macro BS) tracks the location of the MS and the distance from the MS to the target BS (i.e., the femto BS) to detect whether the MS is approaching femtocell coverage (step 131C).

Once the MS is detected to be approaching femtocell coverage, then interference avoidance mechanism is applied (step 132). Under the interference avoidance mechanism, the macro BS continues to serve high-speed MS over the negotiated resource region (step 132A). The femto BS, however, will reschedule its subordinate MSs not to be served by the negotiated resource region when the high-speed MS served by the macro BS is approaching its cell coverage (step 132B). In addition, if the high-speed MS request handover to the femto BS, then the macro BS will not grant the handover request if the handover target is a femto BS (step 132C). By using the interference avoidance mechanism, interference caused by the femtocell is avoided for the high-speed MS without incurring unnecessary frequent handovers.

Although the present invention is described above in connection with certain specific embodiments for instructional purposes, the present invention is not limited thereto. Accordingly, various modifications, adaptations, and combinations of various features of the described embodiments can be practiced without departing from the scope of the invention as set forth in the claims.

What is claimed is:

1. A method of dynamic resource transaction, comprising:
   obtaining a measurement result of a specified radio resource region by a first base station in a wireless Orthogonal Frequency Division Multiple Access (OFDMA)system;
   obtaining a negotiated dynamic resource transaction (DRT) decision based on the measurement result; and
   performing the DRT with a second base station in the wireless OFDMA system, wherein the transacted resource is selected from the group comprising: composite time-frequency radio resource blocks, modulation scheme, coding scheme, and Multiple Input Multiple Output (MIMO) scheme, and wherein the DRT involves exchanging DRT messages between the first base station and the second base station,
   and wherein the DRT comprises of:
      a resource request, and wherein the first base station requests for additional radio resource from the second base station,
      a resource grant, and wherein the first base station grants requested radio resource to the second base station;
      a resource release, and wherein the first base station releases unused radio resource permanently; or
      a resource rent, and wherein the first base station releases unused radio resource temporarily.

2. The method of claim 1, wherein the measurement report is generated either by the first base station or by mobile stations served by the first base station.

3. The method of claim 1, wherein the dynamic resource transaction decision is determined either by a self-organizing network (SON) server, by the first base station, or by the second base station.

4. The method of claim 1, wherein the wireless OFDMA system has a macro-femto overlay network architecture, and wherein the dynamic resource transaction is performed between a macro base station and a femto base station.

5. The method of claim 4, wherein the dynamic resource transaction is performed between two femto base stations.

6. The method of claim 1, wherein the dynamic resource transaction is performed either through backhaul network connections or through air-interface connections.

7. A method of radio resource management, comprising:
   (a) estimating network condition in an overlay macro-femto Orthogonal Frequency Division Multiple Access (OFDMA) network;
   (b) negotiating usage of a specified time-frequency radio resource region between overlay base stations in the OFDMA network, and wherein the negotiating involves reserving a reservation region for high-priority mobile stations in the OFDMA network;
   (c) performing inter-cell dynamic resource transaction based on the negotiation result, wherein the transacted resource is selected from the group comprising: composite time-frequency radio resource blocks, modulation scheme, coding scheme, and Multiple Input Multiple Output (MIMO) scheme, and wherein the DRT involves exchanging DRT messages between a first base station and a second base station;
   (d) adjusting the reservation region configuration based on changed network condition; and
   (e) optimizing intra-cell radio resource management based on the negotiation result, wherein each base station adjusts corresponding resource schedules and sends out corresponding resource allocation commands to subordinate mobile stations.

8. The method of claim 7, wherein the estimating in (a) and/or the negotiating in (b) is performed through a self-organizing network (SON) server.

9. The method of claim 7, wherein the network condition comprises interference level of a specified radio resource region.

10. The method of claim 7, wherein the network condition comprises network load condition of the overlay base stations.

11. The method of claim 7, wherein the network condition comprises a specified quality of service (QoS) target.

12. The method of claim 7, wherein the reservation region is temporarily allocated to low-priority mobile stations via dynamic resource transaction.

13. A method, comprising:
   (a) detecting a mobile station served by a first base station having a first cell coverage, is approaching a second base station having a second cell coverage, in an Orthogonal Frequency Division Multiple Access (OFDMA) network, wherein the second cell coverage is smaller than the first cell coverage and at least portion of the second cell coverage is overlapped with the first cell coverage;
   (b) assigning a negotiated radio resource to the mobile station; and
   (c) performing interference avoidance mechanism when (a) is detected, wherein the interference avoidance mechanism is applied onto the overlay cell coverage region between the first and the second cell coverage, and wherein the interference avoidance involves at least one of: not triggering the handover operation by the first base station, denying a handover request by the mobile station, and scheduling no data to be transmitted over the negotiated radio resource region by the second base station.

14. The method of claim 13, wherein the detecting in (a) is based on uplink signal quality measurement over the negotiated radio resource region.

15. The method of claim 13, wherein the detecting in (a) is based on downlink signal quality measurement over the negotiated radio resource region.

16. The method of claim 13, wherein the detecting in (a) involves position and distance tracking of the mobile station.

* * * * *